United States Patent
Economy et al.

[15] 3,674,894
[45] July 4, 1972

[54] UNSATURATED POLYESTER RESINS MODIFIED WITH ORGANIC DIBASIC ACID SALTS

[72] Inventors: James Economy, Buffalo; Luis C. Wohrer, Lewiston; John H. Mason, Clarence, all of N.Y.

[73] Assignee: The Carborundum Company, Niagara Falls, N.Y.

[22] Filed: May 5, 1970

[21] Appl. No.: 46,568

Related U.S. Application Data

[62] Division of Ser. No. 751,647, June 24, 1968, Pat. No. 3,567,689, which is a division of Ser. No. 353,266, March 19, 1964, Pat. No. 3,418,273.

[52] U.S. Cl. ............................. 260/875, 117/264, 260/17.3, 260/38, 260/39 R, 260/40 R, 260/41 C, 260/57 R, 260/67 R, 260/89.5 R, 260/93.5 A, 260/227, 260/231 R
[51] Int. Cl. ............................ C08f 43/00, C08f 43/02
[58] Field of Search ............................ 260/865, 75 U, 75 S

[56] References Cited

UNITED STATES PATENTS

| | | | |
|---|---|---|---|
| 3,219,604 | 11/1965 | Fischer | 260/22 |
| 3,390,205 | 6/1968 | Schnell et al. | 260/865 |
| 3,557,042 | 1/1971 | Dalhuisen | 260/31.2 |

OTHER PUBLICATIONS

Akita et al., Reinforced Plastics 4,2–5(1958)

Primary Examiner—Melvin Goldstein
Attorney—K. W. Brownell

[57] ABSTRACT

Metal salts of alkanedioic and aromatic dibasic acids are used to improve one or more of the physical properties of certain thermoplastic and thermosetting resins, either before or after exposure to high temperatures.

7 Claims, No Drawings

UNSATURATED POLYESTER RESINS MODIFIED WITH ORGANIC DIBASIC ACID SALTS

This is a division of application, Ser. No. 751,647, filed June 24, 1968 now U.S. Pat. No. 3,567,689, which is a division of application, Ser. No. 353,266, filed Mar. 19, 1964 and now U.S. Pat. No. 3,418,273.

The inventions herein relate to polymer blends derived from divalent metal salts of dibasic organic acids, to mixtures useful in the production of these blends and to processes for their production.

Organometallic salts have been used in a wide variety of polymer compositions, e.g., as fillers, colorants, opaque agents, dulling agents, inhibitors, polymerization catalysts, light stabilizers etc. The organometallic salts of this invention are used to improve one or more of the physical properties of several classes of polymers, for the most part the strength thereof, either initial or after exposure to high temperatures. However, the property which is improved and the extent thereof depends upon the class of polymer involved, each class benefiting uniquely. For example, with the phenol-formaldehyde novolaks, a marked improvement in tensile strength is obtained whereas with cellulosic ethers significant increase in elongation is the most marked improvement obtained. Because the organometallic salts employed in the polymeric compositions described herein have an effect which differs unpredictably from polymer class to polymer class, each class will be dealt with individually hereinafter.

The polymers employed in the novel compositions fall generally into two broad classifications, i.e., thermosetting resins or plastics including the phenolics, ureas, melamines and polyesters, and the thermoplastic resins, including polystyrenes, polyacrylates and cellulose ethers and esters. The elastomers, e.g., natural rubbers, polybutadienes, silicones, linear polyurethanes, are not resins or polymers within the meaning of the terms as used herein. Polyvinylidene chlorides, polyvinyl chlorides and like plasticized polymers are also not within the scope of this invention.

The organometallic metal salts employed in the novel compositions described hereinafter are divalent metal salts of dibasic organic acids selected from the group consisting of alkanedioic and aromatic carbocyclic dibasic acids. The metal cation portion is preferably those of the group II metals of the periodic table, desirably of an atomic number from 12–56, inclusive, and desirably also of the group IIA metals. Calcium is the metal of choice. The dibasic acids preferably contain from four to 12 carbon atoms, more preferably from six to 10.

The saturated alkanedioic acids are preferably of six to 12 carbon atoms, e.g., of the formula $HOOC-(CH_2)_n-COOH$, in which $n$ is 6 to 12. The aromatic carbocyclic dibasic acids are preferably of six to 12 carbon atoms and are preferably disulfonic or dicarboxylic acids. Especially preferred are sebacic acid and the phthalic acids. Calcium sebacate, calcium phthalate, calcium isophthalate and calcium terephthalate, are the organometallic salts of choice with calcium phthalate preferred over all others.

A simple divalent metal salt of a dibasic organic acid can be employed or a mixture of such salts, improved results being sometimes obtained with such mixtures. The salts are employed in amounts from about 2 percent to about 25 percent, preferably about 5 percent to about 20 percent, e.g., 5 to 15 percent, calculated on the weight of the organic polymer or prepolymer employed. The optimum and minimum and maximum amounts will vary from polymer to polymer. As a general rule, however, amounts below 2 percent have relatively little effect and amounts above 25 percent have little favorable effect and produce adverse effects as the percentage is increased. About 5 to 10 percent is usually the amount of choice.

These organometallic salts can be formed in situ when the polymer blend is formed by milling or by polymerization at elevated temperatures, e.g., above about 100° C. and more preferably about 150° C. or above, by the use of a mixture of an anhydride or acid and a hydroxide or oxide of the metal in amounts which will react at elevated temperatures to form the desired amount of the selected organometallic salt, e.g., a mixture of phthalic anhydride and calcium oxide.

The examples set forth hereinafter are illustrative only and are not to be construed as limiting the inventions.

A. PHENOL-FORMALDEHYDE POLYMERS

According to this invention, a polymerizable composition is provided comprising a phenolic prepolymer and from about 2 percent to about 25 percent by weight thereof of a divalent metal salt of a dibasic organic acid as described above. These compositions are polymerized by the process of this invention to form novel resite and cured novolak polymeric compositions having improved thermal stability and other enhanced properties useful in phenolic polymers.

Four basic improvements in physical properties have been observed when an organometallic salt as described herein is incorporated into the mix used to form the phenolic resin, i.e., improved thermal stability, tensile strength, and improved resistance to water and aging. Such improvements allow considerable flexibility in solving such additional problems as ease of processing and dimensional stability. For example, because of the increased strength from use of the herein described metal salts, a lower strength phenolic with a higher flow can be used. This leads to a process improvement by increasing flow rate in the mold. Similarly, this improved strength allows the use of shorter asbestos fibers in reinforced phenolics leading to better processability and use of a lower cost fiber.

The improvement in water resistance results in improved dimensional stability and surface properties such as electricals, etc.

The improvement in thermal stability and aging extends the usefulness of phenolic resins into higher temperature applications. Thus, such modified phenolics find use at temperatures 50°–75° C. above the present temperature limitations for phenolics.

The phenolic prepolymers of the polymerizable compositions of this invention include novolaks, preferably unmodified, resitols and resoles.

Novolaks are acid catalyzed phenol resins having a phenol/formaldehyde ratio greater than 1, exhibiting very little, if any, cross-linking and are permanently fusible and soluble. Their mean molecular weight is usually less than 1,000. They can react under alkaline conditions, heat and pressure to form methylol groups which then yield resite type products.

Resoles are A-stage alkaline catalyzed resins soluble in alkalies, alcohols, ketones and to some extent water. They have a high hydroxyl content and a relatively low molecular weight.

Although preferably unmodified, the phenolic prepolymers can be modified with the conventional modifiers, e.g., chromium oxide.

These phenolics are preferably phenol-formaldehyde polymers although cresol or part cresol and other alkyl phenols and other aromatic hydroxy compounds can be used as the precursor as well as most active aldehydes, e.g., acetaldehyde, glyoxal and furfural.

The polymerizable compositions of this invention can include modifying agents, e.g., glycerol, fatty acids and alkyd resins, and fillers and extenders, e.g., wood flour, walnut-shell flour, asbestos, cellulosic or glass fibers, rubber, carbon, mica, oxides, silicates and carbonates, including zinc oxide, barium oxide, calcium oxide, titanium oxide, zinc oxide, calcium carbonate, diatomite, alumina, silicon carbide, barium sulfate, etc. Because the property enhanced the most is thermal stability, the heat resistant extenders and fillers conventionally employed in high temperature phenolics are the fillers of choice. Articles reinforced with glass, asbestos, paper or cotton cloth, mats or sheets or fibers employing a polymerizable composition of this invention are especially preferred embodiments of this invention.

The preferred cured articles of this invention are formed from about 5–80 parts by weight of phenolic resin, about 1–15 parts by weight of organometallic salt and about 94–5 parts by weight of filler, preferably 10 to 60 of the resin, 1 to 10 of the salt and 89 to 30 of filler.

The usual curing techniques and procedures are employed in the process of this invention. Both wet and dry formed phenolic prepolymers can be employed. Usually the prepolymer is employed as a finely ground powder. As with conventional phenolic resins, fine particle size and thorough mixing of ingredients are desirable.

The novel polymerizable compositions can be used to form laminates, compression cast and transfer molded articles as well as jet molded and extrusion formed articles.

The following are examples of phenolic blends of this invention and the cured resins formed therefrom.

Example 1: Unmodified Phenolics (Unfilled)

Control samples were prepared by mixing 400 g of an unmodified novolak with a molecular weight ($\overline{M}_n$) of 839 and a hexamethylene tetramine content of 9.3 percent and a melting point of 102°–108° C., with 100 g CaO in a Waring blender for two 1-minute periods at a speed of 17,000 rpm. An 8 ⅜ × 8 ⅜ × ⅛ inch frame mold was then charged with 260 g of this blend and a plaque was compression molded for one-half hour at 171° C. ± 5.5° and 1,800 psi ± 10 percent. ASTM D–638 specimens, Type 1, were cut from this plaque.

Samples were also prepared using a mix of 360 g of the above-described novolak, 90 g of CaO and 50 g of one of the following:

C–1. $CaCO_3$ (comparative sample)
C–2. Calcium valerate (comparative sample)
C–3. Calcium hexanoate (comparative sample)
C–4. Sebacic acid (comparative sample)
1a. Calcium sebacate
1b. Calcium isophthalate
1c. Calcium terephthalate
1d. Barium sebacate
1e. Zinc sebacate
1f. Calcium azelate The tensile strength of all samples was tested according to ASTM D–638, before and after heat aging for 24 hours in a forced air oven at 285° C. ± 5°. The test results are summarized in Table Ia.

TABLE Ia

| Sample | psi | Original % of Control | After 24 hrs. 285°C. psi | % of Control |
|---|---|---|---|---|
| Control | 9300 | 100 | 2000 | 100 |
| C–1 ($CaCO_3$) | 9200 | 99 | 900 | 45 |
| C–2 (Ca valerate) | 5600 | 60 | 800 | 40 |
| C–3 (Ca hexanoate) | 5600 | 60 | 200 | 10 |
| C–4 (Sebacic acid) | 6100 | 66 | 700 | 35 |
| 1a | 8800 | 95 | 5900 | 295 |
| 1b | 12400 | 133 | 7800 | 390 |
| 1c | 12000 | 129 | 3200 | 160 |
| 1d | 9500 | 102 | 3600 | 180 |
| 1e | 6300 | 68 | 3400 | 170 |
| 1f | 8400 | 90 | 4200 | 210 |

1g. Following the procedure of Example 1a, other samples were prepared in which the amount of calcium sebacate was varied from 25 – 100g (5 – 20 percent) with corresponding variations in the amount of novolak. The original tensile strength of the samples varied from 78 –95 percent of the control but the tensile strength after 24 hours at 285° C. varied from 230 – 310 percent of the control sample (without the calcium sebacate). Amounts above about 20 percent calcium sebacate gave no advantage in strength.

1h. eighty parts of a novolak resin of 740 molecular weight, 10 parts of the barium salt of a meta-benzene-disulfonic acid and 10 parts of hexamethylene tetramine were intimately mixed and ground to pass through a 100 mesh sieve. The sieved material was pressed into a test plaque at 166° C./1,000 psi for 1 hour followed by a post cure at 150° to 160° C. for 6 hours. After curing the test piece was reground, screened through a 60 mesh sieve and its weight loss characteristics in air compared with a control test piece, not containing the barium salt, treated in the same manner. The percentage weight losses of the unmodified versus the modified novolak resins are shown in Table Ib.

TABLE Ib

| Temperature °C. | % Weight Loss Unmodified | Modified with 10% Ba salt* |
|---|---|---|
| 350 | 2.5 | 2.2 |
| 375 | 5.0 | 2.6 |
| 400 | 10.0 | 5.3 |
| 425 | 18.0 | 8.5 |
| 450 | 32.8 | 15.0 |
| 475 | 50.0 | 24.0 |
| 500 | 63.0 | 34.0 |

*Calculated on organic portion

Example 2: Unmodified Phenolics (Asbestos filled)

a. Control samples were prepared by blending 300 g short fiber asbestos, (Quebec Asbestos Mining Association 6D20), 560 g. unmodified novolak having a $\overline{M}_n$ of 839, a melting point of 102°–108° C. and a hexamethylene tetramine content of 9.3 percent, and 140 g. CaO in a sigma arm mixer operating at a speed of 35.6/59.6 rpm for 1 hour. ASTM D–638 test specimens, Type 1, one-eighth inch thick, were compression molded for one-half hour at 171° C. ± 5.5° and 1,800 psi ± 10 percent.

b. Using the same procedure, novolak and asbestos test specimens were prepared from the following compositions: 300 g short fiber asbestos, 480 g of the above-described novolak, 120 g CaO and 100 g calcium sebacate.

The tensile strength of Examples 2(a) and 2(b) specimens were tested according to ASTM D–638, before and after heat aging for 6 and for 24 hours in a forced air oven at 285° C. ± 5°. The test results are summarized in Table II.

TABLE II

| Sample | Original strength | Strength after aging at 285° C. | |
|---|---|---|---|
| | | 6 hours | 24 hours |
| 2a (control) | 6800 psi | 4500 | — |
| 2b | 8300 psi | 7400 | 7000 |
| (% of control) | 122% | 164% | — |

Example 3: Unmodified Phenolics (Asbestos filled)

The procedure of Examples 2(a) and 2(b) was followed except that long fiber asbestos (Quebec Asbestos Mining Association 3R-12) was substituted for the short fiber asbestos. Substantially the same results are obtained as in 2(b) at both 10 percent and 5 percent calcium sebacate levels.

Example 4: Unmodified Phenolics (grit-filled)

a. Control samples were prepared by mixing 880 g $Al_2O_3$ abrasive grain having an average grain size of 2.05 mm with 30 g of an NaOH catalyzed resole having a formaldehyde:phenol ratio of 0.5 and a viscosity of 1,000–2,000 cps. This mix was then blended with 90 g of an unmodified novolak having an $\overline{M}_n$ of 765, a melting point of 95°–100° C and a hexamethylene tetramine content of 9.0 percent. Dog-bone shaped test specimens having a minimum cross section of 1 × ½ were cold pressed to a structure having 19.3 percent by volume voids. These test samples were cured in a forced air oven for 8 hours at programmed temperatures which reached a peak of 180° C.

b. Using the same abrasive grain and phenolic resins, samples were prepared in which 9 g of the novolak was substituted by 9 g calcium sebacate.

The tensile strength of the samples was tested at 24° and 260° C. Additional samples were heated to 300° C for one-half hour prior to testing at 24° and 260° C. Other samples were boiled in $H_2O$ for 24 hours or soaked in $H_2O$ for 7 days prior to testing. The test results are summarized in Table III.

TABLE III
Tensile Strength, p.s.i.

| Sample: | 177° cure, 24° C. test | 260° C. test | ½ hr. post cure at 300° C. 24° C. test | ½ hr. post cure at 300° C. 260° C. test | 24 hrs. boiling in $H_2O$ | 7 day soaking in $H_2O$ |
|---|---|---|---|---|---|---|
| 4(a) (control) | 1,414 | 695 | 778 | 587 | 826 | 1,292 |
| 4(b) | 2,044 | 922 | 1,330 | 888 | 971 | 2,124 |
| Percent of control | 145 | 133 | 171 | 151 | 118 | 164 |

Example 5: Phenolic Laminates a. Seven mil Kraft paper was impregnated with a NaOH catalyzed resole having a formaldehyde:phenol ratio of 1:2, a viscosity of 6,000 cps and a solid content of 70 percent, at a weight ratio of paper to resin (solids) of 1:1. The paper was impregnated with the resole mix by immersing the paper in the mix for 1 to 3 minutes. The wet paper was then squeezed through a slit to obtain the desired pick-up. The impregnated paper was then predried at room temperature for 2 hours. Drying was completed in circulating air at 93° C. for 5 minutes.

The impregnated paper was cut into 9 × 9 inch squares. Twelve of these squares were used to form a laminate with the sheets alternating perpendicularly with respect to machining direction. The laminate was molded between chromium plated metal plaques for one-half hour at 164° C. ± 3° and 1,000 psi. The sheets were then cooled to room temperature in 5 minutes under pressure.

b. Other sheets of the 7 mil Kraft paper were impregnated with a dispersion formed by blending 1 kg of the above-described resole with 78 g of calcium isophthalate in a paint mill, at the same 1:1 weight ratio. The laminates were molded and test specimens prepared as described above. The test results are summarized in Table IV.

TABLE IV

| Samples | Tensile strength after heat aging for 24 hours at 200°C. psi | % Control |
|---|---|---|
| 5a | 5830 | 208 |
| 5b (Control) | 2800 | 100 |

Comparable results are obtained by substituting the barium or calcium salt of meta-benzene sulfonic acid for the dicarboxylic acid salts employed in Examples 1 to 5.

B. AMINO-FORMALDEHYDE POLYMERS

According to this invention a polymer composition is provided by curing a mixture comprising an amino-formaldehyde fusible resin, e.g., melamine-formaldehyde, urea-formaldehyde, thiourea-formaldehyde and aniline-formaldehyde resins and mixtures thereof, and from about 2 percent to 25 percent of the weight of the amino-formaldehyde compound of a divalent metal salt of a dibasic organic acid as described above.

The amino-formaldehyde prepolymers preferred for the polymerizable compositions of this invention are the melamine formaldehyde prepolymers especially those wherein the ratio of melamine to formaldehyde is about 1:2 to 1:3, particularly the novolaks. The most useful are those classified in the trade as compression or transfer molding grades melamine-formaldehyde compounds.

Amino-formaldehyde polymers are for the most part employed in conjunction with a carbohydrate filler, e.g., wood or walnut-shell flour, preferably alpha-cellulose, paper, rayon or cotton in woven or non-woven form, to form laminates and castings. Generally they are available as the monomer or low-stage resins or prepolymers. Although the aniline-formaldehyde compounds produce thermoplastic resins, they are useful in many of the same areas of applications as the thermosetting urea, thiourea and melamine resins.

The novel amino-formaldehyde polymerizable compositions, especially the urea and melamine compositions, are useful for forming laminates, e.g., by dipping sheets or fabric in the polymerizable solution containing a polymerization catalyst, removing the excess, drying under controlled conditions to partially set the resin and laminating a multiplicity of layers under heat and high pressure.

They are also useful to form molded articles, using about 25–50 percent of a flour or cellulosic material as a filler, and the usual methods of molding these thermosetting plastics in the absence of the organometallic salt. If the molding composition is supplied as pills or tablets, the organometallic salt is preferably thoroughly blended with the amino-formaldehyde compound before the formation of the pills or tablets.

The polymerizable compositions of this invention are also useful in producing foams which are of particular value, e.g., as insulation, because of improved tensile and flexural strength. For example, a water soluble urea-formaldehyde resin containing 2 to 25 percent by weight of a divalent metal salt of an organic acid, calculated on the weight of the urea-formaldehyde compound, and wood flour or other filler, beaten into a foam and cured by addition of suitable catalysts and dried, makes foams both above and below 0.05 density of greater strength and resistance to cracking than the corresponding foams in which the salts are omitted.

The following illustrates the amino-formaldehyde blends of this invention and their use.

Example 6: Melamine-Formaldehyde Blends a. Two hundred and twenty-five g of an alpha-cellulose-containing melamine-formaldehyde molding compound having a density of 1.5 (Cymel 1077, American Cyanamide) was homogenized with 25 g calcium terephthalate on a hammer mill. A chromium plated steel mold of the size 8 ½ × 8 ½ × ⅛ inch was charged with the mix and the molding was carried out at 167° C. and 2,000 psi pressure over a period of 3 minutes allowing a "pump-breath" after the first minute. The plaque was ejected after cooling down to 49° C. Test specimens for the determination of the tensile strength (ASTM D–638, Type 1), flexural strength (ASTM D–790), and deflection temperature (ASTM D–640) were prepared and tested.

Using the same procedure, test specimens were also prepared from compositions in which the calcium terephthalate was replaced by the same amount of calcium isophthalate, azelate or sebacate or the salt was omitted as a control.

The test results are summarized in the following Table V.

TABLE V

| Samples | Tensile Strength psi | Flexural Strength psi | Deflection Temp. °C Hardness |
|---|---|---|---|
| 6a Ca Terephthalate | 9,600 | 19,900 | 220 |
| 6b Ca Isophthalate | 10,800 | 20,500 | 220 |
| 6c Ca Azelate | 11,100 | — | 213 |
| 6d Ca Sebacate | 9,930 | 17,900 | 200 |
| 6e Control | 6,670 | 15,200 | 210 |

Comparable results are obtained by substituting an equivalent amount of calcium phthalate or calcium or barium meta-benzene disulfonic acid for the dibasic acid salts employed in Examples 6(a) to 6(d).

C. POLYESTERS

According to this invention, a polymerizable composition is provided comprising a polyester prepolymer containing ethylenic unsaturation and from about 2 percent to about 25 percent by weight of the prepolymer of a divalent metal salt of a dibasic organic acid as described above.

The polyester prepolymers employed in the polymerizable compositions of this invention are the unsaturated ester class of casting and low-pressure laminating resins, i.e., polyester prepolymers having unsaturated ethylenic groups. These polyesters polymerize through carbon to carbon bonding to form cross-linked thermosetting structures. They are generally prepared by the use of an unsaturated di- or polybasic acid, e.g., maleic acid, or an unsaturated alcohol, e.g., allyl alcohol or both, as a portion of the esterification mixture. Another unsaturated compound, e.g., up to 50 percent styrene, can be included in the prepolymer mixture to form a copolymer, along with the halogenated and antimony compounds conventionally included in such prepolymer mixtures.

These polyesters are preferably condensation products of di- or polyols and di- or polycarboxylic acids, e.g., the polyester formed by the esterification of aliphatic glycols, e.g., ethylene glycol, propylene glycol, a polyethylene ether glycol, etc., with an aliphatic or aromatic dicarboxylic acid or mixture thereof which provides the ethylenic unsaturation in the acid moiety, e.g., a mixture of phthalic and maleic anhydrides. As stated above, the mixture can include other polymerizable monomers or polymers containing ethylenic unsaturation, e.g., styrene, to copolymerize with the unsaturated groups in the polyester and modify the properties of the polyester. As used to prepare thermosetting resins, they are generally viscous liquid prepolymers or "contact resins" which, when mixed with an appropriate catalyst, usually a peroxide catalyst, spontaneously set to a hard resin. For further description of this class of materials, see U.S. Pat. Nos. 2,370,565; 2,370,566; 2,370,572; 2,370,573; 2,370,574; 2,370,578; 2,384,115; to 2,384,125. These polyester forming mixtures are conventionally employed in conjunction with a fibrous material, e.g., spun glass filaments or fabric to form large articles and self-supporting structures. See U.S. Pat. Nos. 2,276,004; 2,337,007; 2,342,988; 2,392,108; 2,392,707; and 2,394,730.

Polyesters are a relatively expensive class of resins. Their widespread use is therefore a tribute to their versatility. It is highly desirable to employ inexpensive fillers or extenders to reduce their cost. However, it is difficult to provide extenders which retain the desired qualities of polyester resin.

It has now been found that divalent metal salts of the dibasic organic acids described above act as extenders for polyesters which not only retain their desirable properties but often these properties are enhanced, particularly their tensile strength, which is a highly unexpected result.

The divalent salt is employed in an amount between about 2 and 25 percent, preferably within the range of about 5 to 10 percent. The selected salt, preferably calcium phthalate, and the selected polyester prepolymer, preferably a styrene modified liquid polyester prepolymer, are thoroughly mixed prior to catalyzed curing or polymerization. Conventional casting, molding and polymerization techniques can be employed.

The following is illustrative of the polyester blends of this invention.

Example 7: Polyester Blends a. Three hundred g of a styrene-modified general purpose (ethylene glycol-phthalic and maleic anhydride) polyester having a viscosity of 2,700 cps/25° C. (Brookfield) was catalyzed with 5.6 ml of a 60 percent solution of methylethyl ketone peroxide in dibutyl phthalate. Thirty g calcium adipate was added and the mass was thoroughly mixed. This mix was cast into an 8 × 8 × ¼ inch glass mold and cured in a water bath at 50° C. for 17 hours. A rigid polyester sheet was obtained. This sheet was post-cured at 90° C. for 24 hours. Test specimens (according to ASTM D–638, size No. 1) were cut.

Using the same procedure, test specimens were also prepared employing the same polyester resin and catalyst in the same amounts but substituting 30 g calcium terephthalate for the calcium adipate or omitting the salt completely as a control.

The tensile strength of these specimens was tested according to ASTM D–638. The test results are shown in TAble VI.

TABLE VI

| Samples | Tensile Strength psi | % Control |
|---|---|---|
| 7a Ca Adipate | 6200 | 123 |
| 7b Ca Terephthalate | 5820 | 115.1 |
| 7c Control | 5040 | 100 |

Comparable results are obtained by substituting an equivalent weight of calcium phthalate or sebacate or calcium or barium meta-benzene disulfonic acid for the dibasic acid salt employed in Examples 7(a) and 7(b).

D. POLYSTYRENES

According to this invention, there is provided mixtures of polystyrene and from about 2 percent to about 25 percent by weight thereof of a divalent metal salt of a dibasic organic acid as described above. These mixtures can be formed into shaped articles of manufacture having improved tensile strength, either before or after heat aging, compared with the identical shaped article formed entirely of the selected polystyrene.

The shaped article of manufacture can be formed by extrusion, molding, machining, casting to form sheets or oriented films, foam casting or molding, e.g., to form oriented foamed sheets by balloon extrusion. The conventional styrene polymerization techniques can be used to form the polystyrene. Although the compositions of this invention are ordinarily produced by blending the selected polystyrene with the selected organometallic salt, they can also be formed by polymerization of styrene in the presence of the organometallic salt, e.g., by batch mass, solution or emulsion or suspension polymerization or continuous mass polymerization in which the styrene monomer and organometallic salt are thoroughly mixed before or during polymerization.

When polystyrene is employed, a heat resistant grade, e.g., a high purity homopolymer or a copolymer formed with up to about 35 percent vinyltoluene, is preferred. These are referred to in the trade as injection molding or extrusion grade.

Contrary to the results obtained with most fillers, the organometallic slats employed in these compositions do not adversely affect heat distortion temperature. Sunlight yellowing is often reduced and critical elongation as well as tensile strength is improved. Inert fibrous fillers, e.g., glass filament or fibers or asbestos fibers are desirably incorporated into the shaped articles of manufacture.

The following is illustrative of the polystyrene blends of this invention.

Example 8: Polystyrene Blends a. One hundred and ninety g of a heat resistant polystyrene with a melt flow of 1.04 g per 10 minutes (ASTM D–1238, condition G) and a density of 1.06 (Dylene 9) was milled with 10 g calcium isophthalate on a two roll mill for 5 minutes. The front and back roll were kept at 167° C. The mix was compression molded at 177° C. and 3,000 psi, using a 6 × 6 × one-sixteenth inch mold. Test specimens were cut and the tensile strength of these specimens was tested, according to ASTM D–638, in which samples are tested, before and after heat aging in a forced air oven.

Samples 8(b) (2 percent calcium isophthalate) and 8(c) (no calcium isophthalate) were prepared and tested using the same procedure.

The results are given in the following Table VII.

TABLE VII

| Samples | Tensile Strength Initial psi | % of Control | After heat aging 48 hours at 195°F psi | % of Control |
|---|---|---|---|---|
| 8a 5% Ca Isophthalate | 6360 | 134 | 6000 | 119 |
| 8b 2% Ca Isophthalate | 4870 | 103 | 5650 | 112 |
| 8c Control | 4750 | 100 | 5050 | 100 |

Comparable results are obtained by substituting an equivalent amount of calcium phthalate or sebacate or calcium or barium meta-benzenedisulfonic acid for the calcium isophthalate employed in Examples 8(a) and 8(b).

E. ACRYLATES

According to this invention, there is provided mixtures of a polyacrylate and from about 2 percent to about 25 percent by weight of a divalent metal salt of a dibasic organic acid as described above. These mixtures, when hot blended, can be formed into shaped articles of manufacture having improved resistance to thermal degradation compared to corresponding articles formed solely from the polyacrylate.

The polyacrylate compositions can be formed into shaped articles of manufacture, by e.g., molding extrusion casting or machining, in the same manner as conventional polyacrylates.

The polyacrylates employed in this invention are the thermoplastic polymers of esters of acrylic acid and methacrylic acid, preferably the lower-alkyl esters of one to four carbon atoms and preferably the methyl ester, and mixtures or copolymers thereof. Polymethyl methacrylate and polymethyl acrylate are the polymers of choice.

The compositions of this invention are generally formed by blending the selected organometallic salt with the melted polyacrylate until a uniform mixture is obtained, e.g., by hot milling. The compositions are generally substantially free from other organic polymeric materials. However, when a calcium phthalate is employed, a copolymer of methylmethacrylate and, e.g., 10–40 percent of styrene or acrylonitrile can be used with improved results. Conventional fillers and reinforcing fibrous materials can also be incorporated in the compositions.

The following illustrates the polyacrylate blends of this invention.

Example 9: Polymethyl Methacrylate Blends a. 142.5 g of a heat resistant polymethyl methacrylate with a density of 1.19 and a refractive index of 1.49 (Rohm & Haas Plexiglas V100) was milled on a two roll mill with 7.5 g calcium isophthalate (5 percent) at 177° C. for 5 minutes. The blend was molded in a 6 × 6 × one-sixteenth inch mold at 177° C. and 4,000 psi pressure.

Test specimens were cut and the tensile strength of these specimens was tested, according to ASTM D–638, in which samples were tested before and after heat aging (48 hours at 105° C. in a forced air oven).

Samples 9(b) and 9(c) were made using the same procedure but employing lesser amounts of calcium isophthalate. In sample 9(d) calcium terephthalate was substituted. Sample 9(e) was the control with no acid salt. The test results are summarized in the following Table VIII.

TABLE VIII

| Samples | Initial Tensile strength psi | % of Control | After heat aging 48 hours at 220°F. psi | % of Control |
|---|---|---|---|---|
| 9a 5% (Ca Isophthalate) | 9450 | 104 | 9350 | 130 |
| 9b 2% (Ca Isophthalate) | 8800 | 97 | 8440 | 118 |
| 9c 1% (Ca Isophthalate) | 9290 | 102 | 7440 | 103 |
| 9d 5% (Ca Terephthalate) | 9280 | 102 | 8820 | 123 |
| 9e (Control) | 9070 | 100 | 7180 | 100 |

Comparable results are obtained by substituting an equivalent weight of calcium phthalate or sebacate or barium meta-benzenedisulfonic acid for the dibasic acid salts employed in Example 9(a) – 9(d).

F. CELLULOSE DERIVATIVES

According to this invention, cellulose derivative mixtures are provided comprising a thermoplastic ether or ester of cellulose and from about 2 percent to about 25 percent of a divalent metal salt of a dibasic organic acid as described above. These compositions, especially when formed into shaped articles of manufacture such as sheets, films, filaments, etc., have superior elongation than the corresponding cellulose derivative in the absence of the organometallic salt. The improvement is particularly noticeable after exposure to elevated temperatures. They thus have improved utility in the areas of use for cellulose derivatives, e.g., films, sizing materials, etc. where good elongation is desired.

The cellulose ethers include the aliphatic ethers, e.g., the water soluble methyl, ethyl, α-hydroxypropyl, hydroxyethyl, carboxymethyl and carboxyethyl ethers, and the organic solvent soluble ethers, e.g., propyl, butyl, amyl ethers and mixed ethers, e.g., methyl hydroxypropylcellulose.

The cellulose esters include the aliphatic, aryl, and inorganic esters, e.g., cellulose acetate, cellulose propionate, cellulose butyrate, sodium cellulose sulfate, nitrocellulose, sodium cellulose phosphate, mixed esters, e.g., cellulose acetate butyrate, cellulose acetate propionate, of conventional degrees of substitution. Preferred derivatives are cellulose acetate and ethyl cellulose.

For the most part, the cellulose blends of this invention contain only a cellulose derivative or derivatives as the polymeric component. They can, however, include the conventional stabilizers, lubricants, etc. They are ordinarily formed by hot milling a melt of the selected cellulose derivative and the selected organometallic salt. However, they can also be formed from solution or suspension.

The following illustrates the cellulose derivative blends of this invention.

Example 10: Ethyl Cellulose Blends a. One hundred and eighty g ethyl cellulose with a density of 1.11 and a flow grade (ASTM D-569) of M-MH (Ethocel 890) was milled with 20 g calcium isophthalate on a two roll mill for 8 minutes. The front roll temperature was kept at 143° C. and the back roll temperature at 93° C.

A 6 × 6 × 1/16 inch mold was charged with 100 g of the blend and the molding was carried out at 177° C. and 4,000 psi pressure.

Samples 10(b) – 10(f) were made using the same procedure but employing varying amounts of calcium isophthalate, or lead isophthalate, barium sebacate or omitting the organic salt as a control.

Test specimens were cut and the tensile strength of these specimens was tested, according to ASTM D-638, in which samples were tested before and after heat aging (48 hours at 105° C. in a forced air oven). The test results are summarized in the following Table IX.

TABLE IX

| Samples | Initial | | After heat aging 48 hrs. at 220° F. | |
|---|---|---|---|---|
| | Tensile p.s.i. | Elongation, percent | Tensile, p.s.i. | Elongation, percent |
| 10(a) 10% Ca isophthalate | 4,620 | 15 | 514 | 7 |
| 10(b) 5% Ca isophthalate | 4,620 | 15 | 481 | 15 |
| 10(c) 2% Ca isophthalate | 3,820 | 15 | 527 | 8 |
| 10(d) 5% Pb isophthalate | 4,220 | 16 | 564 | 13 |
| 10(e) 5% Ba sebacate | 4,360 | 16 | 568 | 10 |
| 10(f) control | 4,040 | 11 | 336 | <5 |

Example 11: Cellulose Acetate Blends a. One hundred and sixty g of a cellulose acetate with a density of 1.29 and a flow temperature of 338° F. (ASTM D-569) was milled with 40 g calcium isophthalate on a two roll mill for 5 minutes. The front roll temperature was kept at 160° C. and the back roll temperature at 155° C.

A 6 × 6 × 1/16 inch mold was charged with 100 g of the blend. A plaque was molded at 182° C. and 4,000 psi pressure. Samples (b) – (h) were prepared using the same procedure but varying the amount of calcium isophthalate, substituting barium sebacate or zinc sebacate or omitting the salt for a control. The yield strength of these blends is shown in the following Table X.

TABLE X

| Samples | Initial Yield Strength | |
|---|---|---|
| | psi | % Control |
| 11a 20% Ca Isophthalate | 6870 | 131 |
| 11b 10% Ca Isophthalate | 6770 | 129 |
| 11c 5% Ca Isophthalate | 6560 | 125 |
| 11d 2% Ca Isophthalate | 6300 | 120 |
| 11e 1% Ca Isophthalate | 6400 | 122 |
| 11f 5% Ba Sebacate | 6550 | 125 |
| 11g 5% Zn Sebacate | 6450 | 123 |
| 11h Control | 5250 | 100 |

The 20 percent calcium isophthalate had notably superior yield strength after heat aging at 93° C. for 84 hours.

Comparable results are obtained by substituting an equivalent weight of calcium phthalate or calcium or barium meta-benzene disulfonic acid for the dibasic acid salts employed in Examples 10(a)–10(e) and 11(a) – 11(g).

We claim:

1. A polymerizable composition consisting essentially of a polyester prepolymer containing ethylenic unsaturation and from about 2 percent to about 25 percent by weight thereof of a divalent Group IIA metal salt of a dibasic organic acid selected from the group consisting of saturated alkanedioic acids, aromatic carbocyclic dicarboxylic acids, and aromatic carbocyclic disulfonic acids.

2. A composition according to claim 1 wherein the prepolymer is a styrene modified prepolymer.

3. A composition according to claim 1 wherein the salt is a Group IIA metal salt of a carbocyclic aromatic dicarboxylic acid.

4. A composition according to claim 3 wherein the acid is a phthalic acid.

5. A composition according to claim 3 wherein the metal salt is a calcium salt.

6. A composition according to claim 3 wherein the salt is a calcium phthalate.

7. A polymerizable composition consisting essentially of a styrene modified polyester prepolymer containing ethylenic unsaturation and from about 5 percent to about 15 percent, calculated on the weight of the prepolymer, of a calcium phthalate.

* * * * *